Figure 1:
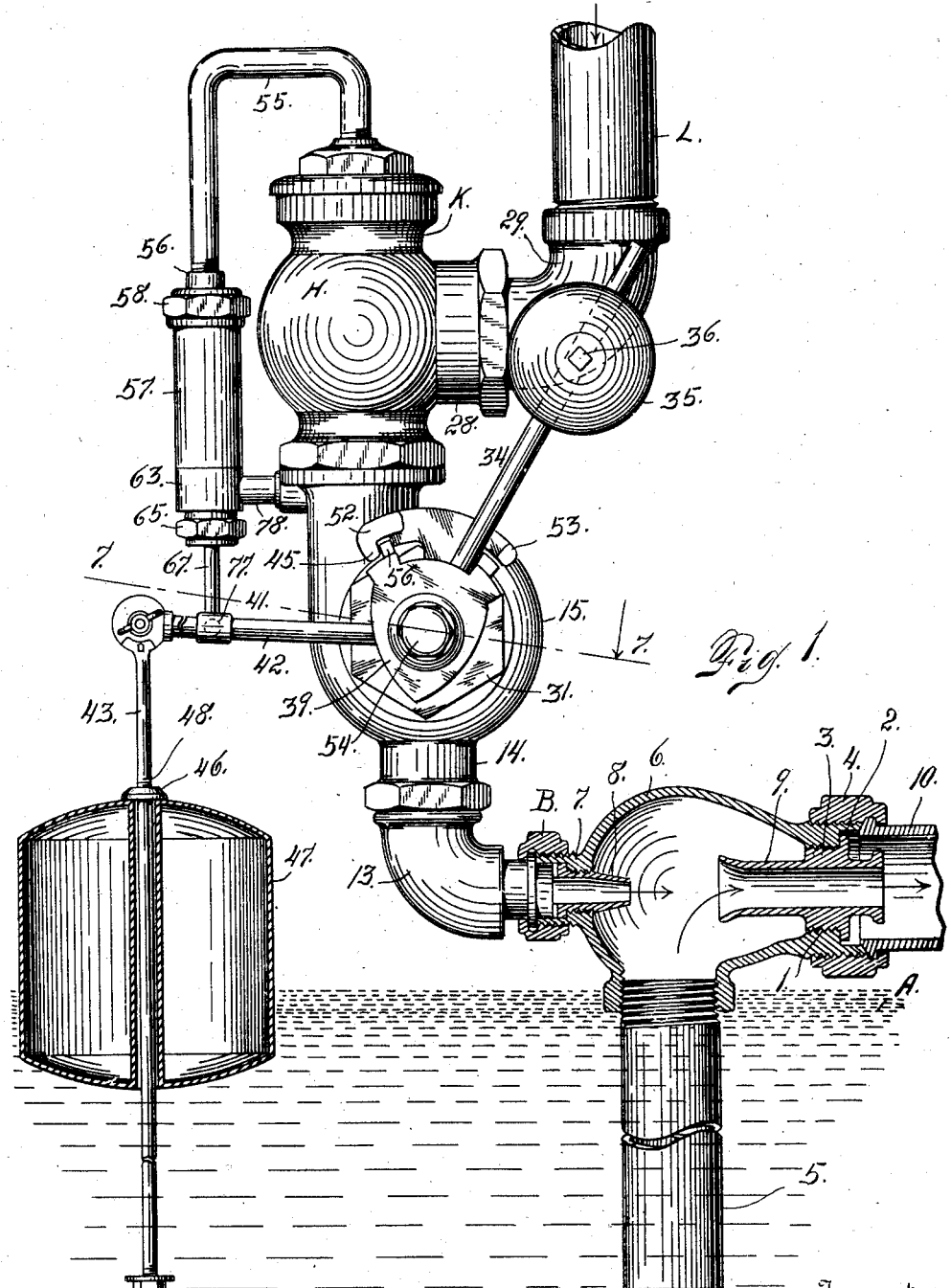

G. WOODALL.
VALVE MECHANISM FOR CONTROLLING FLUID ADMISSION.
APPLICATION FILED DEC. 14, 1908.

970,411.

Patented Sept. 13, 1910.

3 SHEETS—SHEET 1.

Witnesses
Otto E. Hoddick.
Louise Cosmer.

Inventor
G. Woodall.
By
Attorney

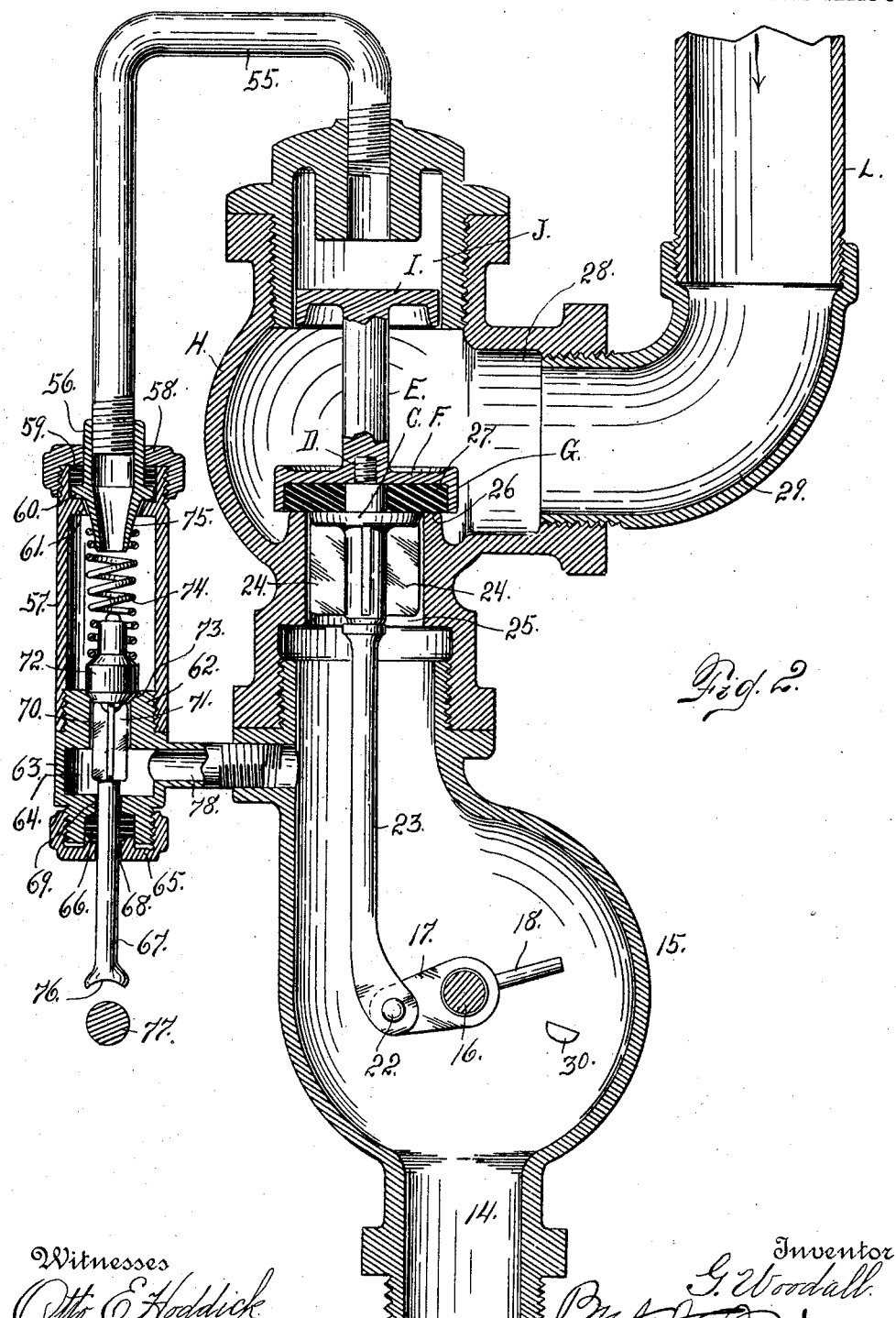

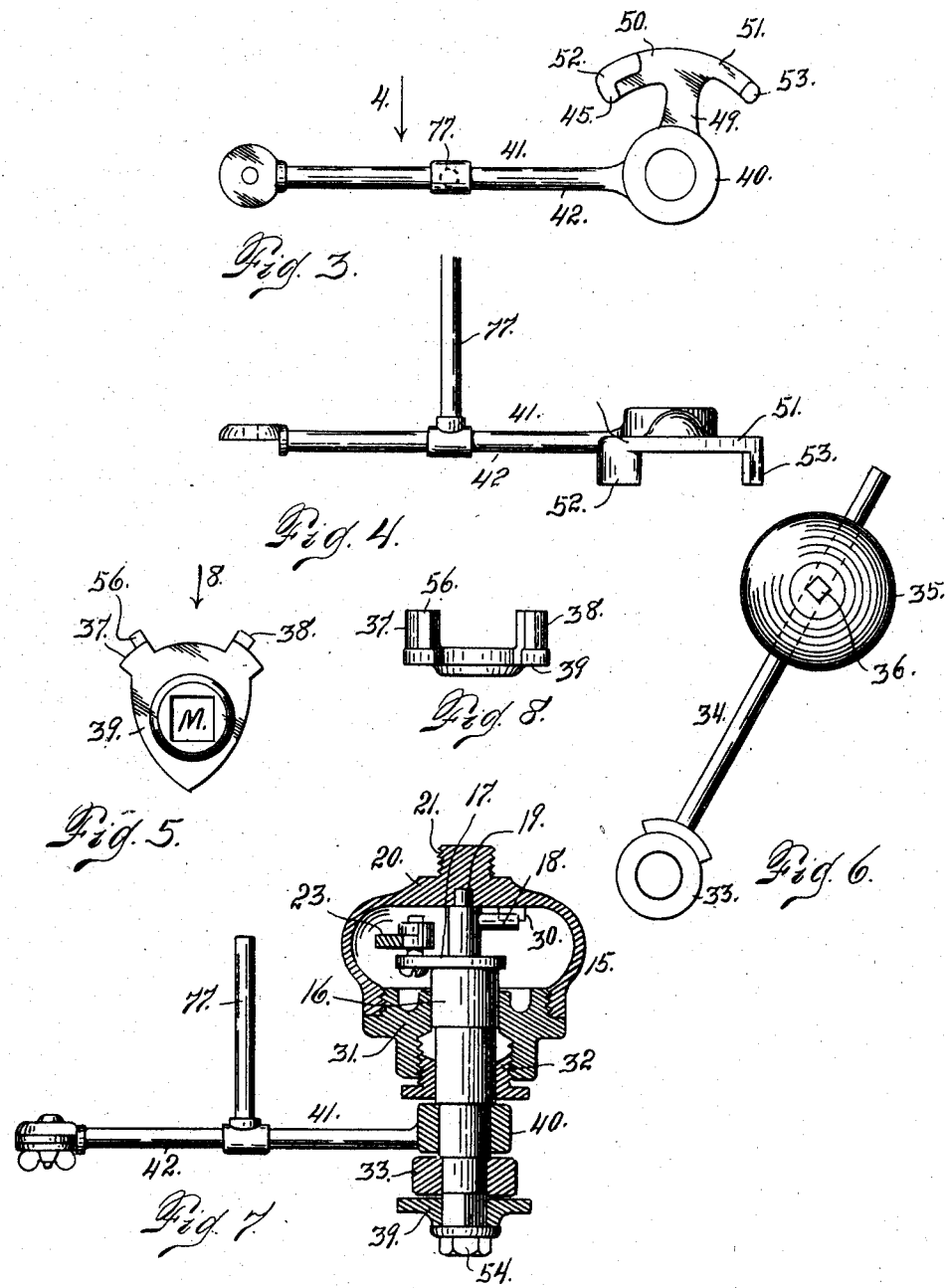

UNITED STATES PATENT OFFICE.

GEORGE WOODALL, OF NEW YORK, N. Y.

VALVE MECHANISM FOR CONTROLLING FLUID ADMISSION.

970,411.  Specification of Letters Patent.  Patented Sept. 13, 1910.

Application filed December 14, 1908. Serial No. 467,383.

*To all whom it may concern:*

Be it known that I, GEORGE WOODALL, a citizen of the United States, residing in the city and county of New York, State of New York, have invented certain new and useful Improvements in Valve Mechanism for Controlling Fluid Admission; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to valve mechanism for controlling the admission of fluid to fluid actuated devices.

The invention is illustrated in connection with the construction set forth in my previous Patent No. 853,850, dated May 14, 1907, entitled "Automatic cellar drain," and makes it practicable to operate the patented device upon a larger scale. In the aforesaid patented construction, a pressure valve is employed, or a valve which opens against a pressure of fluid, either water or steam, which is employed in removing the water from its location. Where this valve is made relatively large as is required by my present construction, the fluid pressure, say fifty pounds to the square inch would be somewhat more than one hundred pounds on the valve, since the enlarged portion of the stem in which the valve proper is seated would have an area of about 2¼ square inches. Hence in my original construction, I could not obtain sufficient power to open the pressure valve, assuming that the latter is of the size aforesaid.

Having thus described my invention in brief, a better understanding of the same may be had by reference to the accompanying drawing in which is illustrated an embodiment of the invention.

In this drawing, Figure 1 is a side elevation partly in section illustrating my improved construction. Fig. 2 is a sectional view of a portion of the mechanism illustrating the improvements, the parts being shown on a larger scale. Figs. 3 and 4 are side and top views respectively, of a trip lever. Fig. 5 is a detail view of what I term the trip-socket. Fig. 6 is a detail view of a weighted lever arm forming a part of the trip mechanism. Fig. 7 is a horizontal section taken on the line 7—7 Fig. 1 looking downwardly. Fig. 8 is a top view in detail of the trip socket, or a view looking in the direction of the arrow Fig. 5.

The same reference characters indicate the same parts in all the views.

Let the numeral 5 designate a suction pipe whose lower extremity is submerged in the water A to be removed. The upper extremity of this pipe is connected with a casing 6. One extremity of this casing is provided with an interiorly threaded nipple 7 into which is screwed the ejector nozzle 8 whose reduced extremity enters the casing 6. Directly in front of this extremity is the interiorly protruding part 9. The part 9 is provided with a collar 3 and a shoulder 2. The collar is exteriorly threaded to enter an interiorly threaded socket formed in the casing. The member 9 projects into a discharge pipe 10 which is connected with the casing 6 by a screw coupling 4.

The ejector nozzle 8 is exteriorly threaded to enter a threaded opening formed in the inlet end of the casing or that opposite the discharge member 9. An elbow 13 is connected with the pressure fluid-receiving end of the casing by a screw coupling B. The extremity of the elbow 13 opposite that connected with the casing 6, has a threaded connection with a short pipe 14 which as shown in the drawing is formed integral with a circular casing 15 into which protrudes a spindle 16. The extremity of the spindle in the casing is provided with oppositely projecting crank arms 17 and 18. The inner extremity 19 of the spindle is journaled in the reinforced part 20 of the casing. This casing is provided with a threaded projection 21 whereby it may be connected with any suitable stationary support (not shown) for the apparatus. The arm 17 of the spindle 16 is pivotally connected, as shown at 22 with the lower extremity of a valve stem 23. This valve stem is provided with wings 24 located in the fluid inlet 25 which form guides for the valve stem. The upper portion of the valve stem is provided with a shoulder C upon which rests the valve proper 27 which engages a seat 26. The upper extremity D of the stem 23 which projects above the valve 27 is threaded into an auxiliary stem E whose lower extremity is enlarged to form a disk F having a depending flange G. The valve 27 engages this disk and is surrounded by the flange G. The auxiliary stem E passes upwardly through a chamber in the casing H, its upper extremity being enlarged to form an auxiliary valve member I loosely mounted in an auxiliary chamber J in the cap threaded into the upper extremity K of the casing H. The casing H is provided on one side with a threaded inlet 28 into which is screwed one extremity of an elbow 29 whose upper extremity has a threaded connection with a fluid supply pipe L.

In the path of the arm 18 of the spindle 16 projects a stop 30 located within the casing 15. The function of this stop is to limit the opening movement of the valve 27 when the latter is actuated as heretofore explained.

The spindle 16 passes through a screw cap 31 which is secured to one extremity of the casing 15. To this cap is threaded a stuffing box collar 32 forming a fluid-tight joint around the spindle where it leaves the casing. Beyond this stuffing box is the eye 40 of a trip lever 41. This eye is loosely mounted on the spindle. The trip lever is provided with an arm 42 whose extremity remote from the eye is pivotally connected with the upper extremity of a rod 43 upon which is slidably mounted a hollow float 47 adapted to engage a stop 46 which is threaded on the rod 43 to permit adjustment. The trip lever 41 is provided with a short arm 49 projecting from the eye 40 and forming a suitable angle with the arm 42. This arm 49 is provided with lateral projections 50 and 51 having lugs 52 and 53.

Adjacent the eye 40 of the trip lever and also loosely mounted on the spindle 16 is the eye 33 of a lever arm 34 upon whose outer extremity is adjustably mounted a ball weight 35 which is held in place by a set screw 36. The eye 33 is loose on the spindle and the arm 34 beyond the eye passes between the two lugs 37 and 38 of a trip socket 39 which is fast on the spindle 16 or connected so that the socket and spindle rotate in unison. As shown in the drawing, the spindle is made square in cross section, and the trip socket is provided with an opening M of corresponding shape. The lugs 37 and 38 of the trip socket are located in the path of the arm 34 so that the weighted arm actuates the trip socket whose movement in turn imparts a partial rotation to the spindle 16 whereby the valve 27 is opened and closed according to the conditions of the water in the cellar, tank or other receptacle to be drained. The weighted arm 34 also passes between the lugs 52 and 53 of the trip lever 41. Hence, as this lever is actuated by the float one of the lugs imparts movement to the weighted arm in one direction and the other in the opposite direction during the operation of opening and closing the valve 27. The trip socket is held in place on the spindle by a screw 54 which enters the threaded socket formed in the outer extremity of the spindle 16. The head of the screw engages the trip socket and holds the latter in operative relation with the other parts of the mechanism.

Connected with the upper extremity of the chamber J is a pipe 55 whose opposite extremity is threaded into a nozzle 56 protruding into the casing 57 and connected therewith by a screw coupling 58, a packing 59 being interposed between the coupling and the shoulder 60 formed on the nozzle, the said shoulder engaging an interiorly projecting collar 61 formed at the upper extremity of the casing.

Into the lower part of the casing 57 is screwed the nipple 62 of an auxiliary casing 63 having a chamber 64. One extremity of the auxiliary casing 63 is provided with a screw cap 65, adapted to hold in place a packing 66 to form a fluid-tight joint. A stem 67 passes through openings 68, 69 and 70 formed in the cap 65, the lower extremity of the auxiliary casing and the nipple 62 of the same respectively, the said stem being provided with guide wings 71 located in the opening 70. The upper extremity of this stem is provided with a relief valve 72 normally engaging a seat 73 formed on the upper extremity of the nipple 62. This valve is normally held in engagement with its seat by a spiral spring 74 which is interposed between the said valve and the inner tapering extremity 75 of the nozzle 56. The lower extremity of the valve stem 67 is upset or enlarged as shown at 76 and lies in the path of a short arm 77 rigidly connected with the arm 42 of the trip lever 41.

When the parts of the mechanism are assembled, they are so arranged that as the float rises it will engage the stop 46 and move the trip lever 41 upwardly; the arm 77 of the trip lever engaging the stem 67 to open the valve 72 and allow any fluid in the chamber J above the auxiliary pressure valve 71, to escape into the casing 15 largely diminishing the resistance which would otherwise be exerted against the opening of the valve. As soon as the relief valve has been opened, the trip lever 41 has moved sufficiently to cause its lug 52 to act on the weighted arm 34 and move the latter to the perpendicular or approximately perpendicular position. Just as the weighted arm reaches this position a shoulder 45 formed on the lug 52 of the trip lever engages a shoulder 56 of the lug 37 of the trip socket, and slightly actuates the latter whereby a corresponding movement is imparted to the spindle 16, to lift the valve 27 slightly from its seat. As soon as this occurs the fluid pressure on the valve from above is relieved and the float which up to this time has been considerably submerged in the water, quickly rises and the lug 52 acts on the weighted arm 34, causing it to fall toward the right, quickly throwing the valve 27 to the wide-open position. It will be understood that the last opening movement of the valve only necessitates a slight movement of the float since this is all that is required to throw the weighted arm 34 off its balance and cause it to fall of its own weight toward the right and act on the trip socket as heretofore explained.

The object of having the balance valve member I loose in its chamber J is to allow the said valve to move without undue resistance and at the same time utilize practically the full fluid pressure upon the pressure valve 27 when the latter is closed, since as the fluid leaks past the balance member and gets behind the same, its influence upon the main pressure valve is zero until the relief valve is opened, thus allowing the fluid behind the balance member to suddenly escape in which event the fluid acts upon the balance member to relieve the pressure which holds the main pressure valve to its seat. By virtue of this construction and arrangement the balance feature is brought into requisition only when needed, namely, immediately before it becomes necessary to open the pressure valve.

Having thus described my invention, what I claim is:

1. In valve mechanism for controlling the admission of fluid to a device to be actuated, the combination with the device to be actuated, of a fluid supply pipe, a pressure valve for controlling the passage of the fluid from the supply pipe to the said device, the said valve having a balance member of such area as to diminish the pressure required to open the said valve, the balance member being mounted to allow the fluid to leak past it, a relief valve connected with said passage, a float and means actuated by the float for opening the relief valve and the pressure valve, the relief valve being opened in advance of the pressure valve to relieve the balance valve member and allow it to partially balance the pressure valve, for the purpose set forth.

2. In valve mechanism of the class described, the combination with a device to be actuated, of a fluid supply pipe, a pressure valve for controlling the passage of the fluid from the supply pipe, the valve having a balance member, a chamber in which said member is mounted somewhat loosely to permit freedom of movement, a relief valve, a fluid passage leading from the chamber of the balance valve member to the relief valve, the latter having a normally closed valve piece, and float-actuated mechanism for successively operating the two valves, the relief valve being opened in advance of the pressure valve, for the purpose set forth.

In testimony whereof I affix my signature in presence of two witnesses.

GEORGE WOODALL.

Witnesses:
G. E. JONES,
FRANK TAXTER.